US012695224B2

(12) United States Patent
Vergis et al.

(10) Patent No.: US 12,695,224 B2
(45) Date of Patent: Jul. 28, 2026

(54) ADAPTER CARD WITH COMPRESSION ATTACHED MEMORY MODULES

(71) Applicant: Intel Corporation, Santa Clara, CA (US)

(72) Inventors: George Vergis, Portland, OR (US); Xiang Li, Portland, OR (US); Jun Liao, Portland, OR (US); Anthony M. Constantine, Portland, OR (US); Min Suet Lim, Gelugor (MY); Tongyan Zhai, Portland, OR (US); Konika Ganguly, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 17/874,111

(22) Filed: Jul. 26, 2022

(65) Prior Publication Data

US 2022/0368047 A1     Nov. 17, 2022

(51) Int. Cl.
*H01R 12/72*          (2011.01)
*G06F 1/184*          (2026.01)
(Continued)

(52) U.S. Cl.
CPC ........... *H01R 12/721* (2013.01); *G06F 1/184* (2013.01); *H01R 12/7076* (2013.01); *H01R 13/2407* (2013.01); *H01R 2201/06* (2013.01)

(58) Field of Classification Search
CPC .... H01R 12/721; H01R 12/7076; G06F 1/185
See application file for complete search history.

(56) References Cited

U.S. PATENT DOCUMENTS 4,738,625 A * 4/1988 Burton ................. H01R 12/714
                                                        439/74
4,838,798 A * 6/1989 Evans ................ H01R 12/7082
                                                        439/493
(Continued)

FOREIGN PATENT DOCUMENTS

JP          2006041381 A      2/2006

OTHER PUBLICATIONS

Office Action for U.S. Appl. No. 17/874,117, Mailed Aug. 26, 2025, 12 pages.

(Continued)

*Primary Examiner* — Neil Abrams
(74) *Attorney, Agent, or Firm* — Compass IP Law PC

(57)          ABSTRACT
An adapter card with compression-attached memory modules that can be inserted into a conventional vertical connector enables use of CAMMs in systems with vertical memory module connectors. In one example, an adapter card or riser card includes a printed circuit board (PCB) having an edge to be received by a dual-inline memory module (DIMM) connector. First conductive contacts proximate to the edge of the PCB are to be received by the DIMM connector, enabling the first conductive contacts to couple with contacts of the DIMM connector. Second conductive contacts on a face of the PCB are to couple with a first compression attached memory module (CAMM) via a first compression mount technology (CMT) connector. The adapter card includes conductive traces on or in the PCB between the first conductive contacts and the second conductive contacts to couple the CAMM with the DIMM connector.

20 Claims, 11 Drawing Sheets

(51) Int. Cl.
    *H01R 12/70*         (2011.01)
    *H01R 13/24*         (2006.01)

(56)            References Cited

U.S. PATENT DOCUMENTS

| | | | |
|---|---|---|---|
| 6,115,278 | A | 9/2000 | Deneroff et al. |
| 6,168,442 | B1 * | 1/2001 | Naoi ................. H01R 13/2414 |
| | | | 439/91 |
| 7,711,887 | B1 | 5/2010 | Warnes et al. |
| 8,089,774 | B2 * | 1/2012 | Choi ........................ G11C 5/04 |
| | | | 174/254 |
| 8,886,892 | B2 | 11/2014 | Thayer |
| 9,105,321 | B1 * | 8/2015 | Kim ..................... G11C 7/1084 |
| 10,467,160 | B2 | 11/2019 | Li et al. |
| 11,074,952 | B1 | 7/2021 | Schnell et al. |
| 11,301,403 | B2 | 4/2022 | Ross et al. |
| 11,762,582 | B2 | 9/2023 | Ross et al. |
| 2003/0161125 | A1 | 8/2003 | Dobler et al. |
| 2005/0174825 | A1 | 8/2005 | Ware et al. |
| 2008/0094808 | A1 | 4/2008 | Kanapathippillai et al. |
| 2008/0140900 | A1 | 6/2008 | Mysliwitz et al. |
| 2011/0302366 | A1 | 12/2011 | Peterson et al. |
| 2013/0039016 | A1 | 2/2013 | Wu et al. |
| 2015/0062797 | A1 | 3/2015 | Yin et al. |
| 2015/0255130 | A1 | 9/2015 | Lee et al. |
| 2015/0262633 | A1 | 9/2015 | Lee |
| 2016/0026596 | A1 | 1/2016 | Klein |
| 2019/0102331 | A1 | 4/2019 | Li et al. |
| 2020/0201564 | A1 | 6/2020 | Walker |
| 2021/0408724 | A1 | 12/2021 | Li et al. |
| 2022/0368047 | A1 | 11/2022 | Vergis et al. |

OTHER PUBLICATIONS

U.S. Appl. No. 17/874,117, filed Jul. 26, 2022, Geroge Vergis.
European Office Action, (EP Exam Report Article 94(3) EPC), for Patent Application No. 23172249.7, Mailed Feb. 24, 2025, 9 pages.
Extended European Search Report for Patent Application No. 23172249.7, Completed on Nov. 23, 2023, 9 pages.
Notice of Allowance for U.S. Appl. No. 17/874,117, Mailed Feb. 4, 2026, 5 pages.

\* cited by examiner

ADAPTER CARD WITH COMPRESSION ATTACHED MEMORY MODULES

FIELD

Descriptions are generally related to computer memory systems, and more particular descriptions are related to a memory module adapter card or printed circuit board.

BACKGROUND

The performance of computing systems is highly dependent on the performance of their system memory. Computing systems, such as desktop and server computing systems, typically include a motherboard with memory module connectors in which memory modules can be installed to increase system memory capacity. For example, vertical memory module connectors are widely used in server and desktop systems for memory capacity and bandwidth scaling.

FIG. 1 illustrates a side view of a computing system 100 with vertical memory module connectors 106. The computing system 100 includes a printed circuit board (PCB) (e.g., a mother board) onto which a system on a chip (SOC) 104 has been mounted or installed. The PCB 102 includes four memory module connectors 106. Conventionally, one vertical connector 106 can host only one memory module 108. Each of the memory module connectors 106 includes a slot or socket into which a memory module 108 can be inserted or seated. The connectors 106 are vertical in the sense that the memory modules 108 are installed vertically or perpendicularly relative to the PCB 102.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
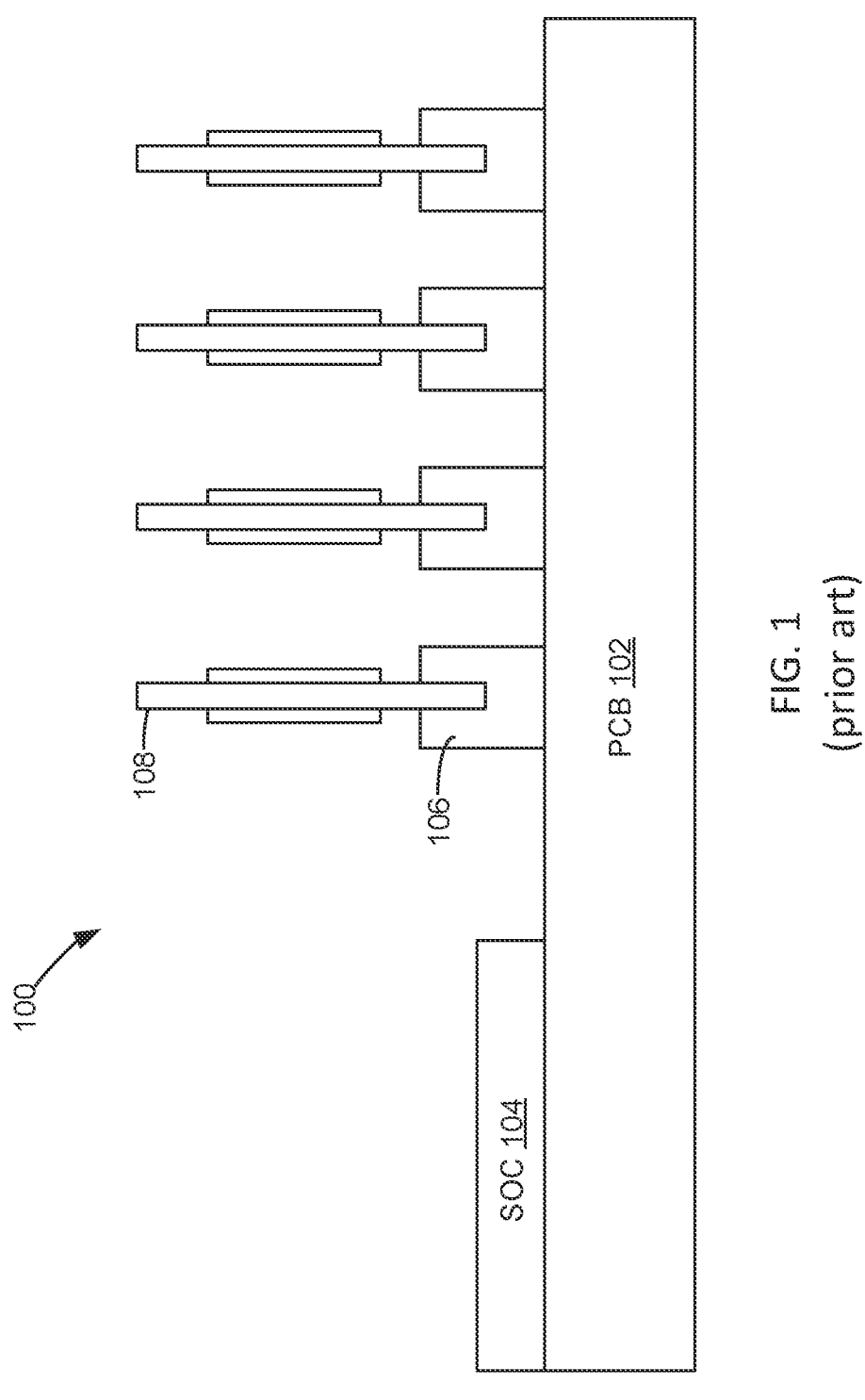
FIG. 1 illustrates a side view of a computing system with vertical memory module connectors.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a memory module adapter card can adapt compression-mounted memory modules to standard memory module connectors, such as DIMM connectors on client or server computing system motherboards.

Conventional vertical memory modules have some limitations in terms of use in certain form factors as well as frequency scaling. Typically, a single vertical connector receives a single memory module, such as a dual inline memory module (DIMM). Therefore, increasing possible memory capacity in a conventional system involves increasing the number of vertical memory modules connectors. Increasing the number of vertical memory module connectors increases the PCB area used for memory. One technology for increasing memory capacity without significantly increasing the PCB area used is three-dimensional stacked DIMMs (3DS DIMMs). A 3DS DIMM include multiple stacked memory dies on the DIMM with vias to form connections between dies. However, current 3DS DIMMs may be prohibitively expensive for mainstream applications.

In addition to the large PCB area consumed by vertical connectors, frequency scaling is also limited with conventional vertical memory module connectors. When using two DIMMs per channel (2DPC), two vertical connectors are used per channel, which limits frequency scaling for the memory bus. Thus, memory capacity and frequency scaling are limited with conventional vertical memory module connectors.

Compression attached memory modules (CAMMs) have emerged as a memory technology for small form factor computing systems. Unlike DIMMs that include pins at an edge of the module, CAMMs typically include a series of contact pads on a face of the module. The CAMM is attached horizontally to the motherboard (e.g., parallel to the motherboard) by compressing the module onto a connector on the motherboard and securing the module with screws.

The contact pads on the face of the CAMM allow for increased contact density relative to conventional DIMMs. Due to the fine contact pitch of CAMMs, CAMMs cannot be installed directly on conventional desktop or server motherboards. A typical desktop or server motherboard typically has four PCB layers, which is insufficient for wire routing for the high density CAMM contacts. Thus, conventional desktop and server systems are not compatible with CAMMs.

In contrast, an adapter card with compression-attached memory modules that can be inserted into a conventional vertical connector enables use of CAMMs in systems with vertical memory module connectors. In one example, an adapter card or riser card includes a printed circuit board (PCB) having an edge to be received by a dual-inline memory module (DIMM) connector. First conductive contacts proximate to the edge of the PCB are to be received by the DIMM connector, enabling the first conductive contacts to couple with contacts of the DIMM connector. Second conductive contacts on a face of the PCB are to couple with a first compression attached memory module (CAMM) via a first compression mount technology (CMT) connector. In one such example, third conductive contacts on a second face of the PCB are to couple with a second CAMM via a second CMT connector. The adapter card includes conductive traces on or in the PCB between the first conductive contacts and the second conductive contacts, and between the first conductive contacts and the third conductive contacts to couple the CAMM with the DIMM connector.

Figure 2A:
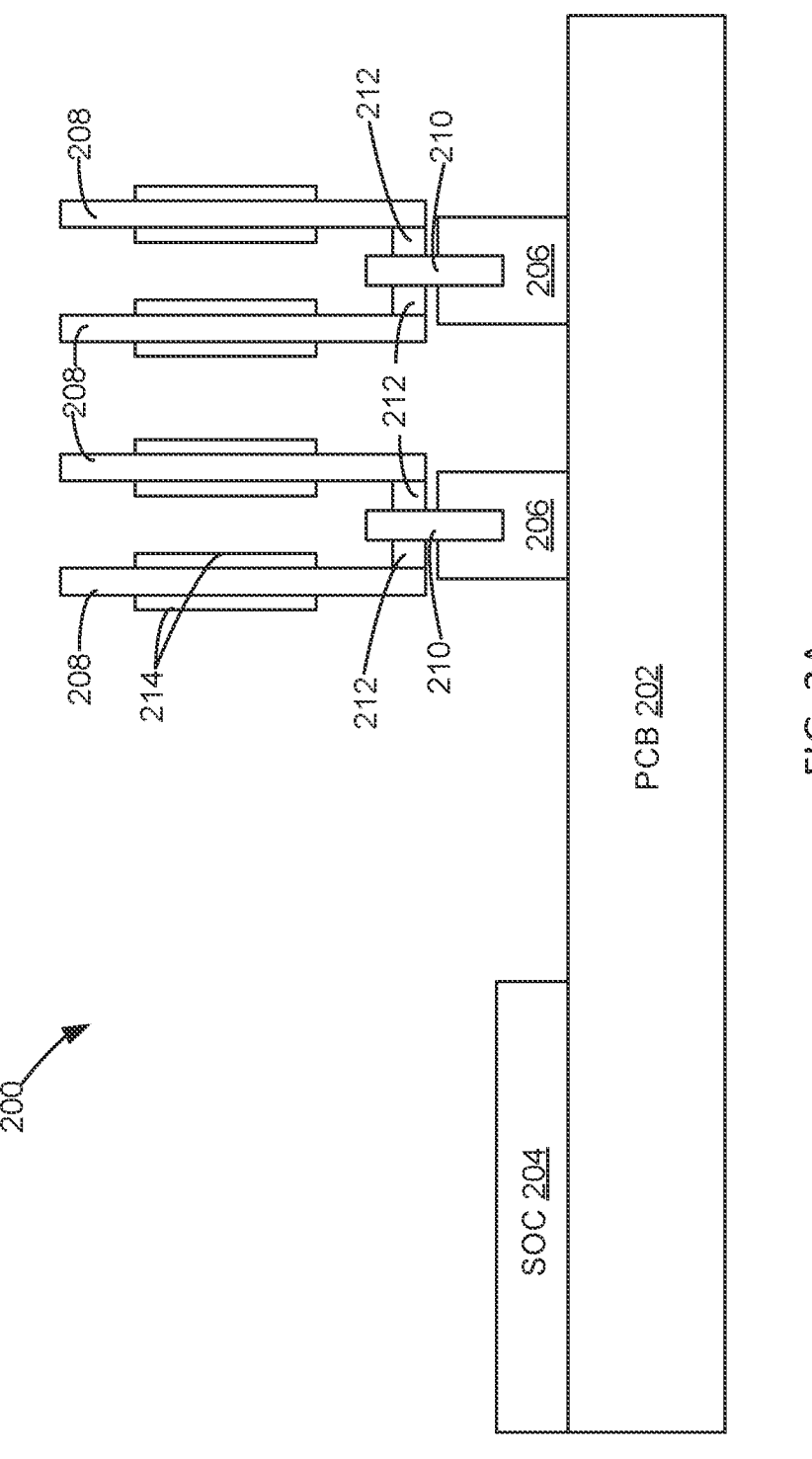
FIG. 2A illustrates a side view of an example of a system including adapter cards with compression-attached memory modules.

FIG. 2A illustrates a side view of an example of a system 200 including adapter cards 210 with compression-attached memory modules 208. The system 200 includes an SOC 204 on a PCB 202. In one example, the SOC 204 includes a processor (e.g., a central processing unit (CPU)) and one or more other components such as a graphics processing unit (GPU), accelerator, storage, memory, input/output circuitry, peripheral interface circuitry, and/or other components. In one example, the PCB is a multi-layer PCB. The PCB may be a motherboard, a main board, a system board, a logic board, or any other printed circuit board onto which components can be attached, mounted, connected, or otherwise coupled. In the example of FIG. 2A, the PCB 202 includes two memory module connectors 206. The memory module connectors 206 may be referred to as vertical connectors. In one example, each of the memory module connectors 206 includes a slot or socket that can receive a memory module, such as a DIMM.

In one example, the memory module connectors 206 are DIMM connectors, such as standard DIMM connectors, MicroDIMM connectors, small outline DIMM (SO-DIMM) connectors, or other DIMM connectors. In one example, the DIMM connectors 106 are compatible with a memory standard such as a double data rate synchronous dynamic random-access memory (DDR) standard, such as DDR3 (Double Data Rate version 3, original release by JEDEC (Joint Electronic Device Engineering Council) on Jun. 27, 2007), DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), or others or combinations of memory technologies, and technologies based on derivatives or extensions of such specifications.

However, as shown in FIG. 2A, instead of a DIMM, the system 200 includes adapter cards 210 inserted into the memory module connectors 206. In one example, an adapter card includes a PCB onto which one or more memory modules can be compressibly attached. For ease of reference and consistency, the following description refers to the apparatus 210 as an adapter card; however, the apparatus 210 may be referred to as a card, an adapter, a compression-attached memory module (CAMM) adapter, a riser card, an interposer, a compression mount technology (CMT) interposer, a module, etc.

Referring to FIG. 2A, the system 200 includes two memory modules 208 compressibly attached to each of the adapter cards 210. For consistency and ease of understanding, the following description generally refers to the memory modules 208 as compression-attached memory modules (CAMMs); however, any memory module that can be attached or coupled with the adapter card 210 may be used. Other terms for the memory modules 208 may be used, such as compression mount technology (CMT) modules, CMT memory modules, memory modules, etc. In one example, there are compressible conductive contacts between a memory module and the adapter card 210. In one example, the compressible conductive contacts may be included in, or a part of, a compression mount technology (CMT) connector 212 between the memory module 208 and the adapter card 210. Each of the memory modules includes memory chips or dies 214 that provide memory to the system 200. Thus, the adapter card includes conductive traces to connect the memory modules 208 to the memory module connectors 206. In one example, the adapter card includes conductive traces between contacts at the memory module side of the card and contacts at the DIMM connector side of the card.

Note that although the system 200 of FIG. 2A illustrates two memory module connectors, other systems may include one memory module connector or more than two memory module connectors (e.g., 3, 4, or more than 4 memory module connectors). Similarly, although FIG. 2A shows two memory modules coupled with each adapter card, a single memory module or more than two memory modules may be coupled with an adapter card. Also note that the elements of FIG. 2A and the following figures are not necessarily drawn to scale.

Figure 2B:
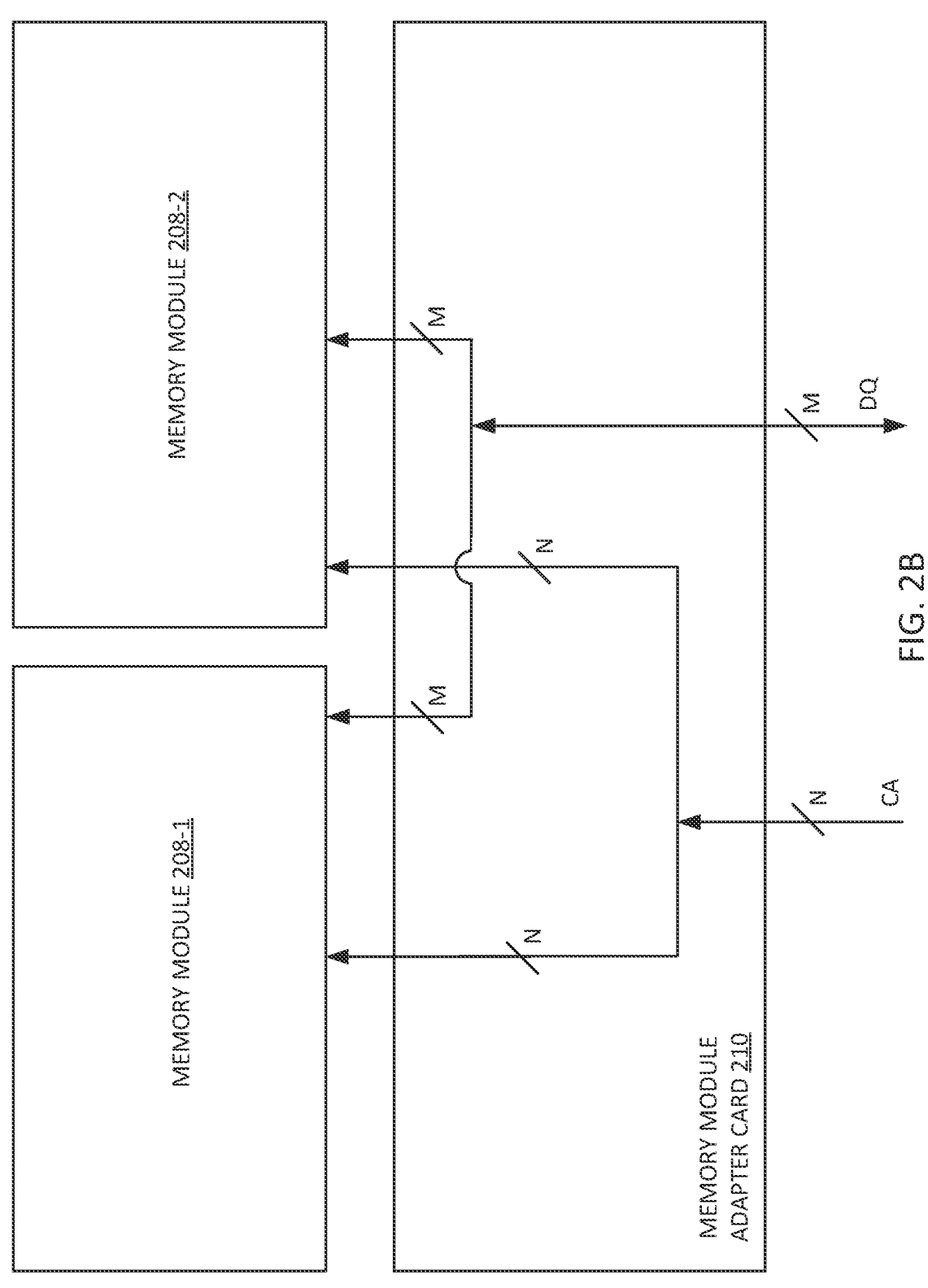
FIG. 2B illustrates a block diagram of an example of an adapter card with compression-attached memory modules.

FIG. 2B illustrates a block diagram of an example of an adapter card with compression-attached memory modules. In the illustrated example, the adapter card 210 couples the data bus (DQ) and the command/address bus (CA) with both memory modules 208-1 and 208-2 in a multi-drop form. Thus, the DQ and CA signals from the host memory controller (e.g., via a vertical DIMM connector) are passed to both memory modules 208-1 and 208-2 via the adapter card 210. In the illustrated example, the CA bus is N bits wide and the DQ bus is M bits wide.

For each memory access (e.g., a read or write access with a corresponding address) that is issued on the memory channel, the corresponding set of CA signals includes chip select signals (CS) and/or other signals that specifically identify a particular memory module (e.g., one of CAMMs 208-1 and 208-2) on the channel and also a particular rank on the identified memory module that is targeted by the access. Circuitry (e.g., register and redrive circuitry) on each memory module monitors the chip select signals and recognizes when its corresponding memory module is being accessed. When the circuitry recognizes that its memory module is being targeted, the logic can then further determine a particular rank of memory chips on the memory module that is being targeted by the memory access. The register and redrive circuitry can then route the CA signals that are on the memory channel to the memory chips of the specific targeted rank of memory chips on the memory module.

Figure 3:
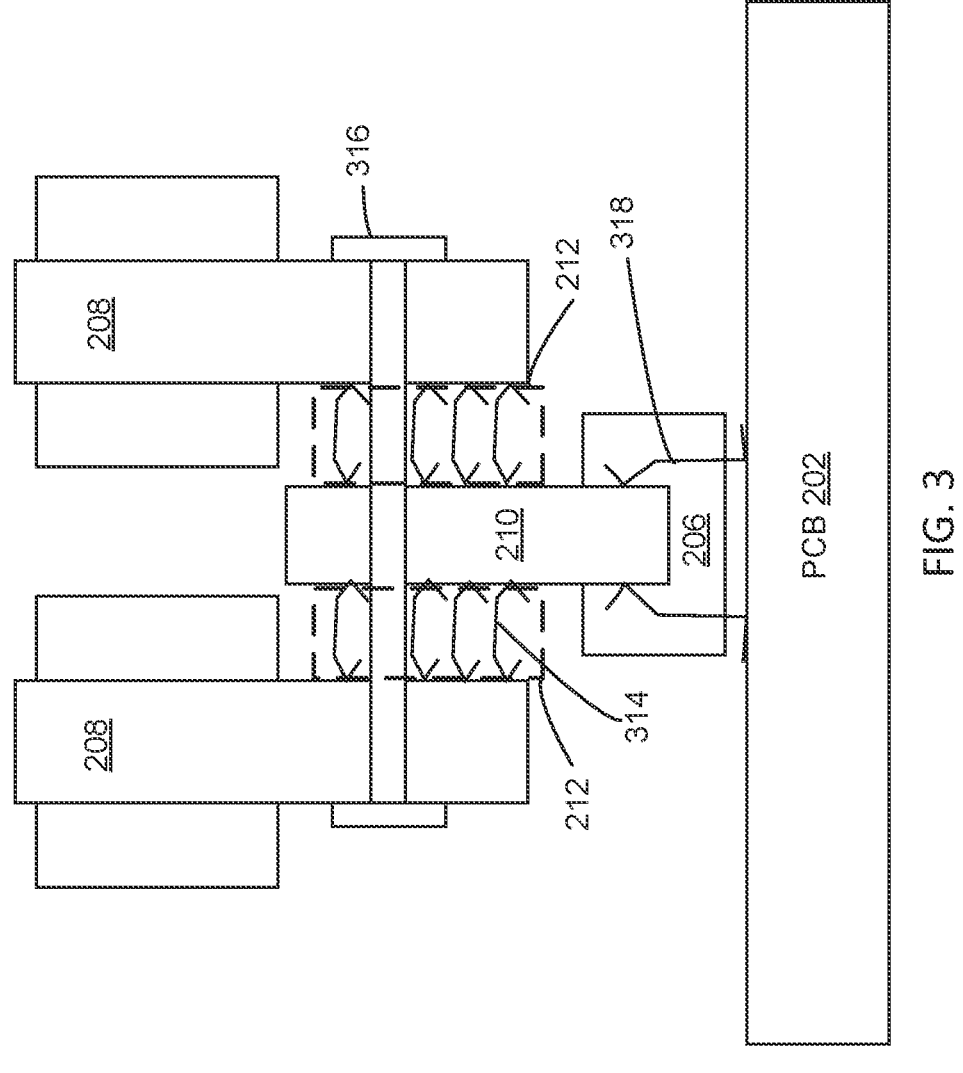
FIG. 3 illustrates a side view of an example of an adapter card with compression-attached memory modules.

FIG. 3 illustrates a side view of an example of an adapter card 210 with compression-attached memory modules 208. As illustrated in the example of FIG. 3, the adapter card 210 is inserted into or seated in the memory module connector 206 on the PCB 202. The adapter card 210 includes first conductive contacts to couple with contacts 318 of the memory module connector 206. In one example, the adapter card 210 includes additional conductive contacts on the faces of the adapter card 210 to couple with the conductive contacts 314 between the adapter card 210 and the memory modules 208.

In one example, the conductive contacts 314 are compressible (e.g., compressible pins) that can be compressed on one or both ends. In one example, the compressible conductive contacts are included in or housed in a connector 212 (e.g., a CMT connector) or other support structure to support and maintain alignment of the compressible conductive contacts 314. In the example illustrated in FIG. 3, the compressible conductive contacts are shown as C-shaped contacts, however, contacts having any shape can be used.

The memory modules 208 are compressibly attached to the adapter card 210 with a fastener 316. In one example, the fastener 316 includes one or more screws that pass through holes in the memory modules 208 and the adapter card 210 to apply pressure to the assembly. In one example, the pressure applied by the fastener 316 compresses the conductive contacts 314 to maintain mechanical stability and electrical connections between the compressible conductive contacts 314 and the contacts on the memory modules 208 and the adapter card 210.

Figure 4:
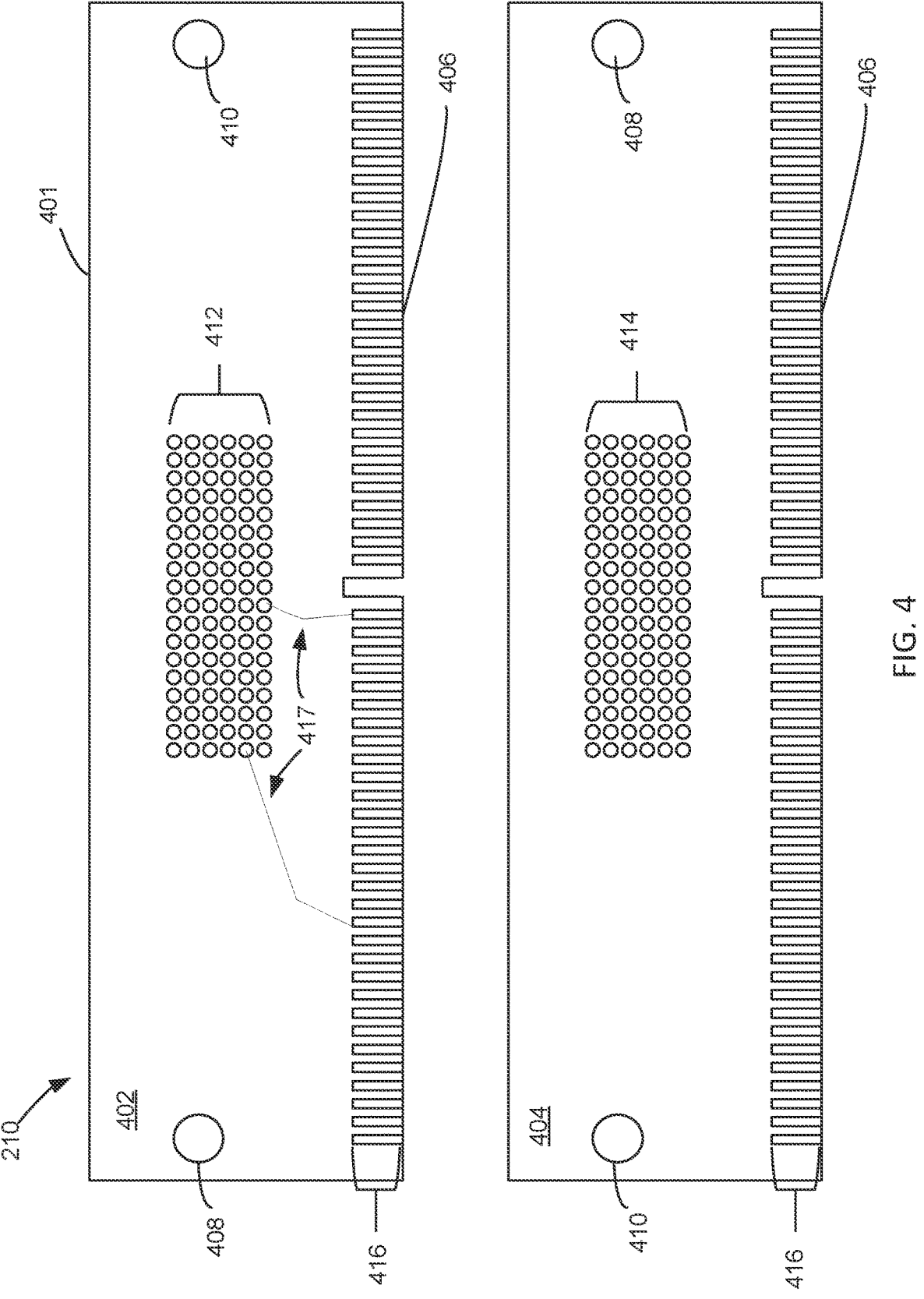
FIG. 4 illustrates front and back faces of an example of an adapter card.

FIG. 4 illustrates front and back faces of an example of an adapter card 210. The adapter card includes a PCB 401. The PCB has an edge 406 to be received by a memory module connector, such as a vertical DIMM connector. The PCB 401 includes conductive contacts 416 to couple with contacts of the DIMM connector (e.g., contacts 318 of FIG. 3). In one example, the first conductive contacts 416 are proximate to the edge 406 of the PCB 401 to be received by the DIMM connector. In one example, the conductive contacts 416 include conductive fingers (e.g., gold fingers) to connect to contacts in the slot of a DIMM connector.

The PCB also includes second conductive contacts 412 on a first face 402 of the PCB 401. In one example, second conductive contacts 412 on the first face of the PCB 401 are to couple with a CAMM via a CMT connector. In the example illustrated in FIG. 4, the PCB also includes third conductive contacts 414 on a second face 404 of the PCB 401. In one example, the third conductive contacts 414 are to couple with a second CAMM via a second CMT connector. In one example, the conductive contacts 412 and 414 are pads to couple with the contacts of a CMT connector.

The PCB includes conductive traces between the first conductive contacts 416 and the second conductive contacts 412, and between the first conductive contacts 416 and the third conductive contacts 414. The example in FIG. 4 illustrates only two conductive traces 417 in order to not obscure the clarity of the drawing, however, in one example, each of the contacts 416 is coupled with one of the contacts 412 and one of the contacts 414 via traces on the PCB 401. Note that the conductive contacts 416, 412, and 414 of FIG. 4 are not drawn to scale and not drawn to be in compliance with a particular standard. The number, size, pitch, and location of the contacts 416, 412, and 414 depend on the type of memory module connector to receive the adapter card 210 and the type of memory module to be attached to the adapter card 210.

In one example, the conductive traces of the adapter card adapt or translate the pinout differences between the compression-attached memory module and the DIMM connector. For example, the conductive traces couple the first conductive contacts 416 having a first pin-out with corresponding contacts of the second conductive contacts 412 having a second pin-out that is different than the first pin-out. In one example, the first conductive contacts include power, ground, and data contacts compatible with a first memory standard (such as a DDR standard) having the first pin-out; and the second conductive contacts include second power, ground, and data contacts compatible with a second memory standard (such as a CAMM standard) having the second pin-out. The conductive traces couple the power, ground, and data contacts of the first conductive contacts 416 with the corresponding power, ground, and data contacts of the second conductive contacts 412. In addition to different pin-outs, in one example, the first conductive contacts have a different pitch than the second conductive contacts 412. For example, the second conductive contacts 412 for coupling with the compression-attached memory module may have a smaller pitch than the conductive contacts 416 for coupling with the DIMM connector. Similarly, in one example, the third conductive contacts 414 has a pin-out and pitch that is different than the first conductive contacts 416.

The example of FIG. 4 also illustrates two holes 408, 410 for a fastener to pass through to attach one or more memory modules to the PCB 401. Although two holes are shown in FIG. 4, other examples may include more than two holes to receive more than two fasteners. The holes 408, 410 are shown as round, however, holes or openings having other shapes may also or alternatively be used to receive fasteners to attach memory modules to the PCB 401.

Figure 5:
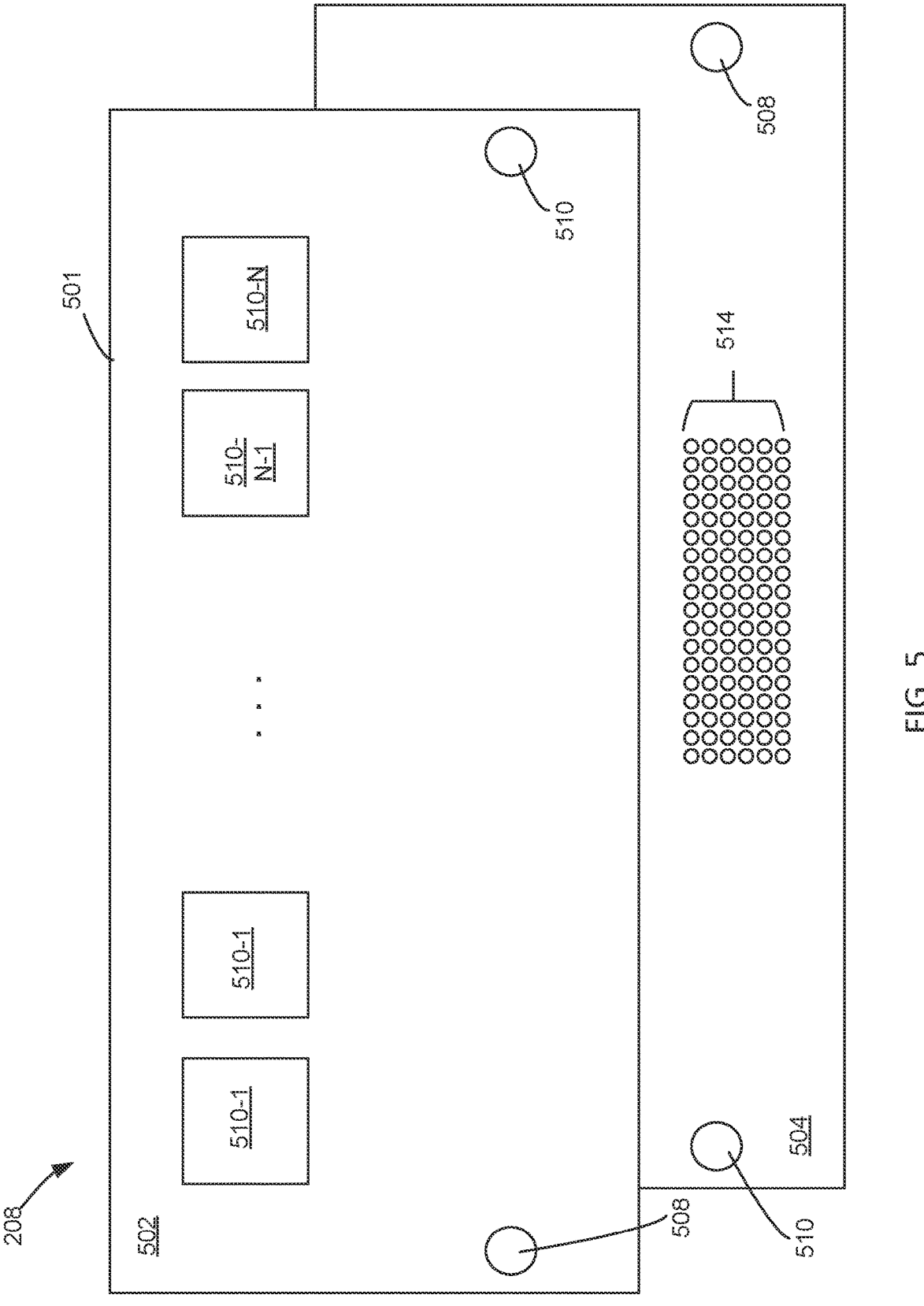
FIG. 5 illustrates front and back faces of an example of a memory module.

FIG. 5 illustrates front and back faces of an example of a memory module 208. In one example, the memory module 208 is a compression-attached memory module CAMM. The CAMM includes a PCB 501 and memory chips or dies 510-1-510-N on one or both faces 502, 504 of the PCB 501. The memory chips 510-1-510-N are coupled with conductive contacts 514 via conductive traces in or on the PCB 501. The conductive contacts 514 are to couple with corresponding conductive contacts on an adapter card (e.g., the conductive contacts 412 or 414 of the adapter card 210 of FIG. 4). In one example, compressible conductive contacts (such as the contacts 314 of FIG. 3) are between the contacts 514 of the memory module and the contacts 412 or 414 of the adapter card. In one such example, a CMT connector is between the contacts 514 of the memory module and the contacts 412 or 414 of the adapter card.

The memory module 208 includes holes 508 and 510 that correspond to holes 408 and 410 in the adapter card. The holes 508, 510 and 408, 410 are to receives fasteners, such as screws, to compressibly attach the memory module 208 to the adapter card 210. In one example, a single memory module 208 can be attached to one face 402 or 404 of the adapter card 210. In another example, two memory modules 208 can be attached to the opposing faces 402, 404 of the adapter card 210. In one such example, a fastener passes through holes in both memory modules 208 and the adapter card 210 to sandwich the adapter card 210 between the two memory modules 208. In an example in which a CMT connector is used to couple the contacts 514 of the memory module 208 with the corresponding contacts 412 or 414 of the adapter card, the CMT connector includes corresponding holes through which the fastener can pass.

Figure 6:
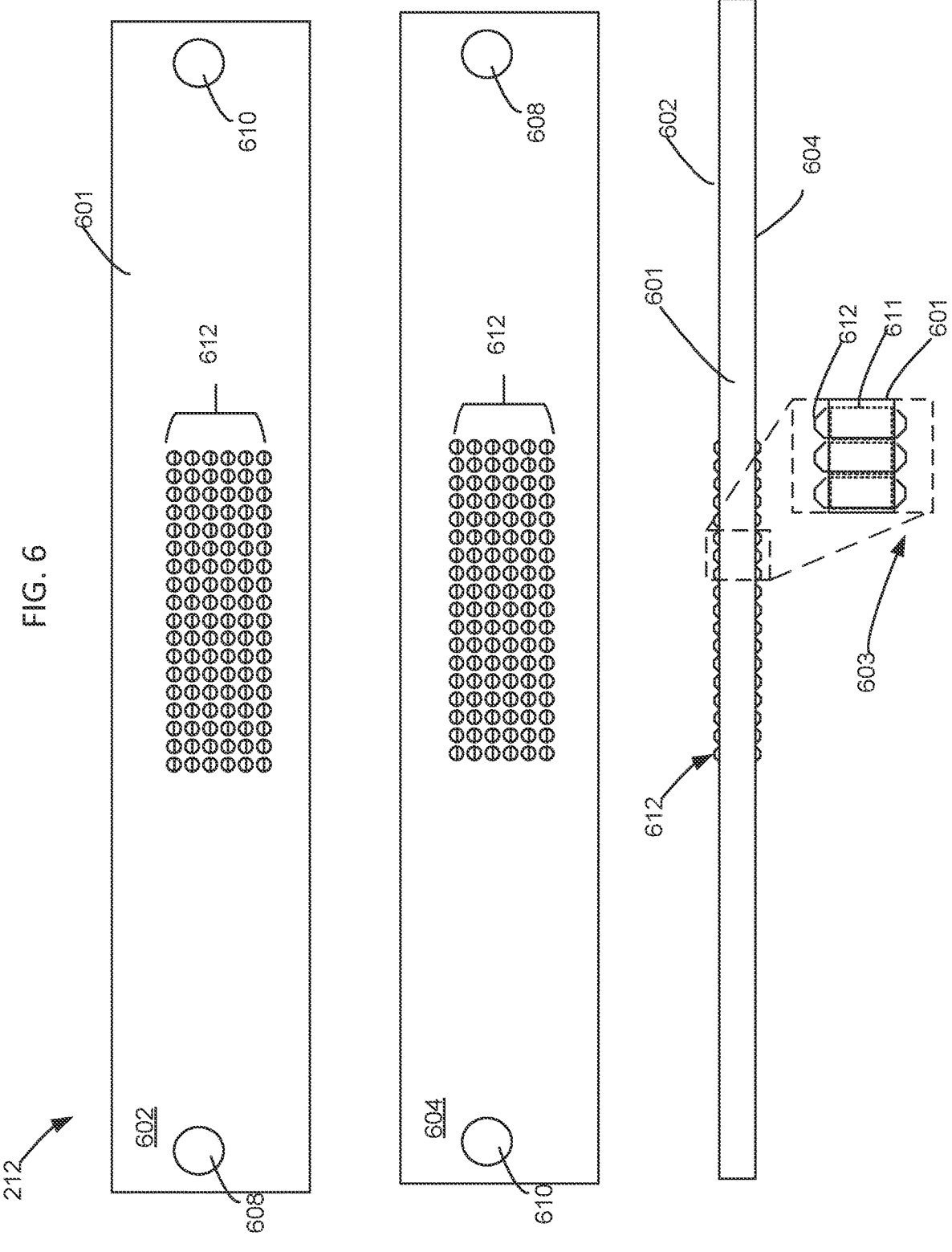
FIG. 6 illustrates front, back, and side views of an example of a CMT connector.

For example, FIG. 6 illustrates front, back, and side views of an example of a CMT connector 212. The CMT connector 212 includes a housing 601 to provide support for the contacts 612. The contacts 612 extend through the CMT connector 212 and are exposed at both faces 602 and 604 of the CMT connector 212. In one example, the contacts 612 are compressible pins, such as the C-shaped pins 314 illustrated in FIG. 3. In other example, the contacts 612 are another compressible pin shape, such as a spring-shape, an S-shape, or pins having other shapes that can be compressed.

In one example, the pins are supported and kept in alignment by an array of holes or openings in the housing. In the example illustrated in FIG. 6, each of the pins 612 is contained in a cylindrical hole or enclosure that extends through the housing 601. For example, magnified view 603 shows an example of a CMT connector 212 with openings 611 in the housing 601 that contain or include C-shaped pins 612, such as the pins 314 illustrated in FIG. 3. However, other shapes of holes or enclosures may be used to support the conductive contacts 612. In one example, the pressure applied by the fasteners through the holes 608 and 610 to the CMT connector 212, the adapter card 210, and the memory module(s) 208 cause the contacts 612 to compress slightly into the holes in which they are enclosed.

Thus, an adapter card with compression-attached memory modules can be used to adapt CAMMs to conventional DIMM connectors on a motherboard that could not otherwise support CAMMs. When using two memory modules per channel (e.g., 2DPC), an adapter card can enable using a single connector for each channel, resulting in less spacing between adjacent memory modules, more connector-to-connector spacing, and less area occupied on the motherboard. For example, a three-channel memory subsystem can be achieved with only three DIMM connectors instead of six DIMM connectors that would be required in a conventional system. In addition to the PCB space savings. Although some examples above illustrate two compression-attached memory modules on an adapter card, other examples may include more than two compression-attached memory modules (e.g., 3, 4, or more than 4 CAMMs attached to an adapter card).

Figure 7A:
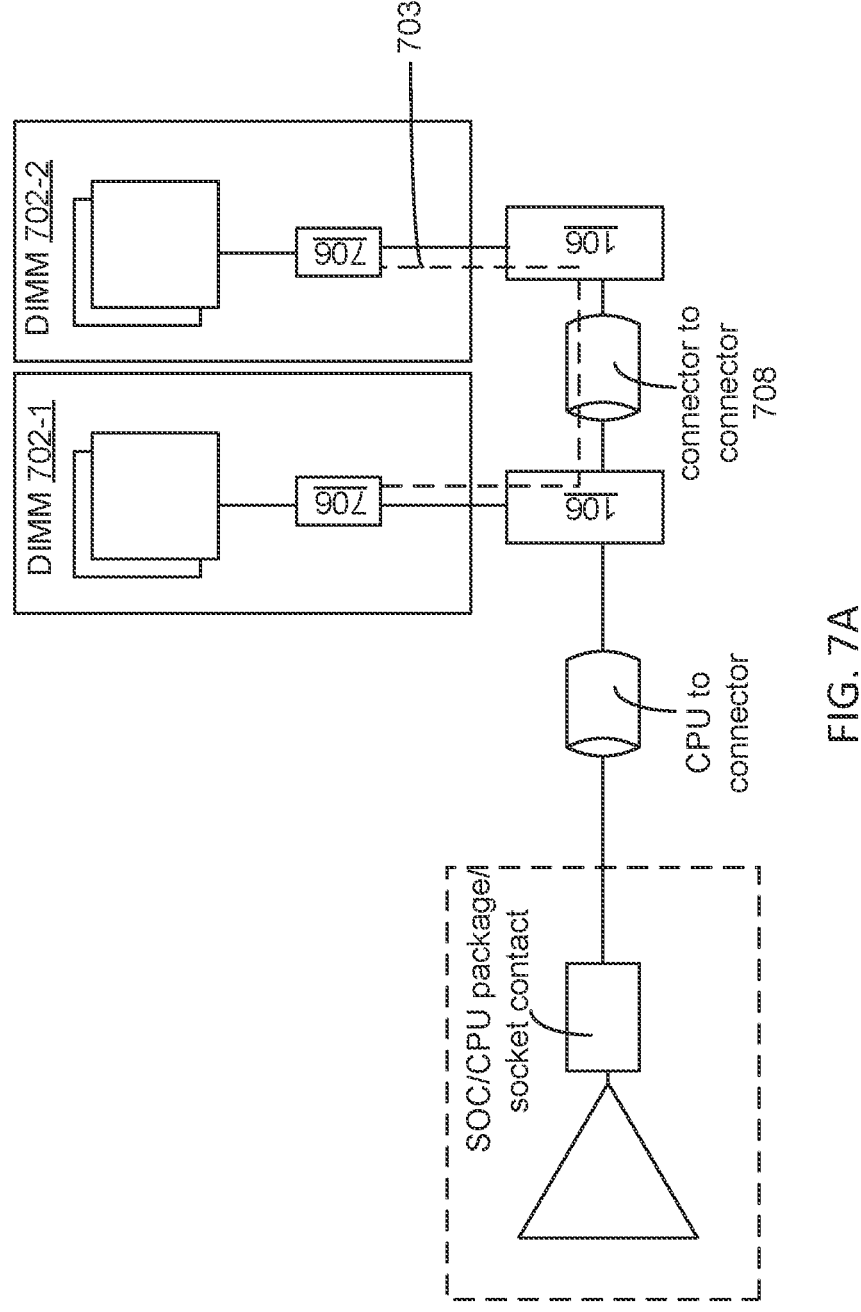
FIG. 7A is a diagram showing an example of the distances between two DIMMs in conventional DIMM connectors.
Figure 7B:
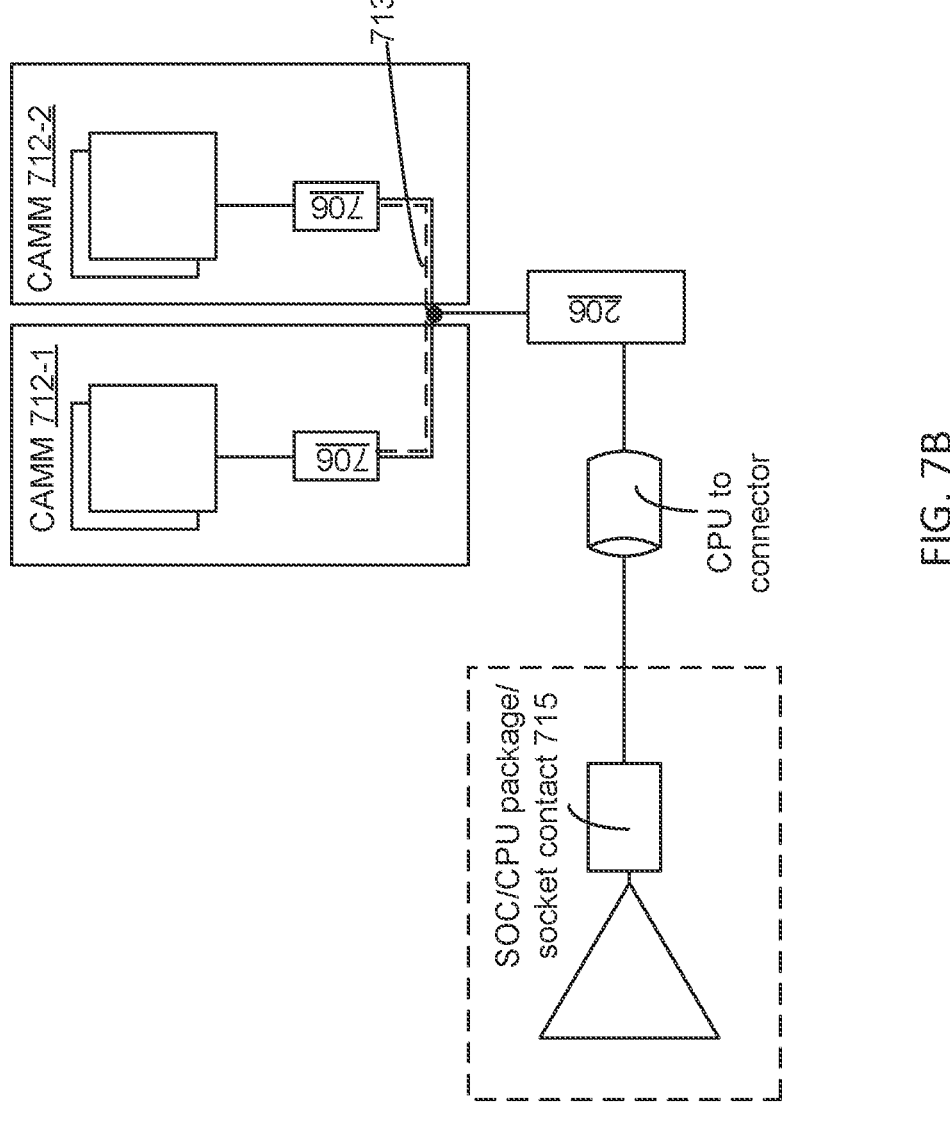
FIG. 7B is a diagram showing an example of the distances between two memory modules attached to an adapter card in a DIMM connector.

FIGS. 7A and 7B illustrates how the distances between two memory modules can be reduced with an adapter card. FIG. 7A is a diagram showing an example of the distances between two DIMMs 702-1 and 702-2 in conventional DIMM connectors 106 on a motherboard. The interconnection 703 between the contacts 706 of the DIMMs 702-1 and 702-2 includes the connectors 106 on the motherboard in addition to the "connector-to-connector" trace or wire 708. In contrast, FIG. 7B is a diagram showing an example of the distances between two compression-attached memory modules 712-1 and 712-2 attached to an adapter card in a DIMM connector 206. In the example in FIG. 7B, the interconnection 713 between the two CAMMs 712-1 and 712-2 does not pass through the motherboard, a second DIMM connector, and connector-to-connector traces. Thus, the distance of the interconnection 713 in FIG. 7B is much shorter than the distance of the interconnection 703 of FIG. 7A. The shorter interconnection or stub between the two memory modules can enable reduced termination strength and provide significantly better signaling for systems implementing two modules per channel. Thus, better signal integrity scaling and more frequency headroom for 2DPC scaling can be achieved with only one vertical connector and a CMT connector. Additionally, using the adapter card and compression-attached memory modules can enable a shorter routing length for far connector (e.g., relative to the SOC or CPU socket contacts 715).

Figure 8:
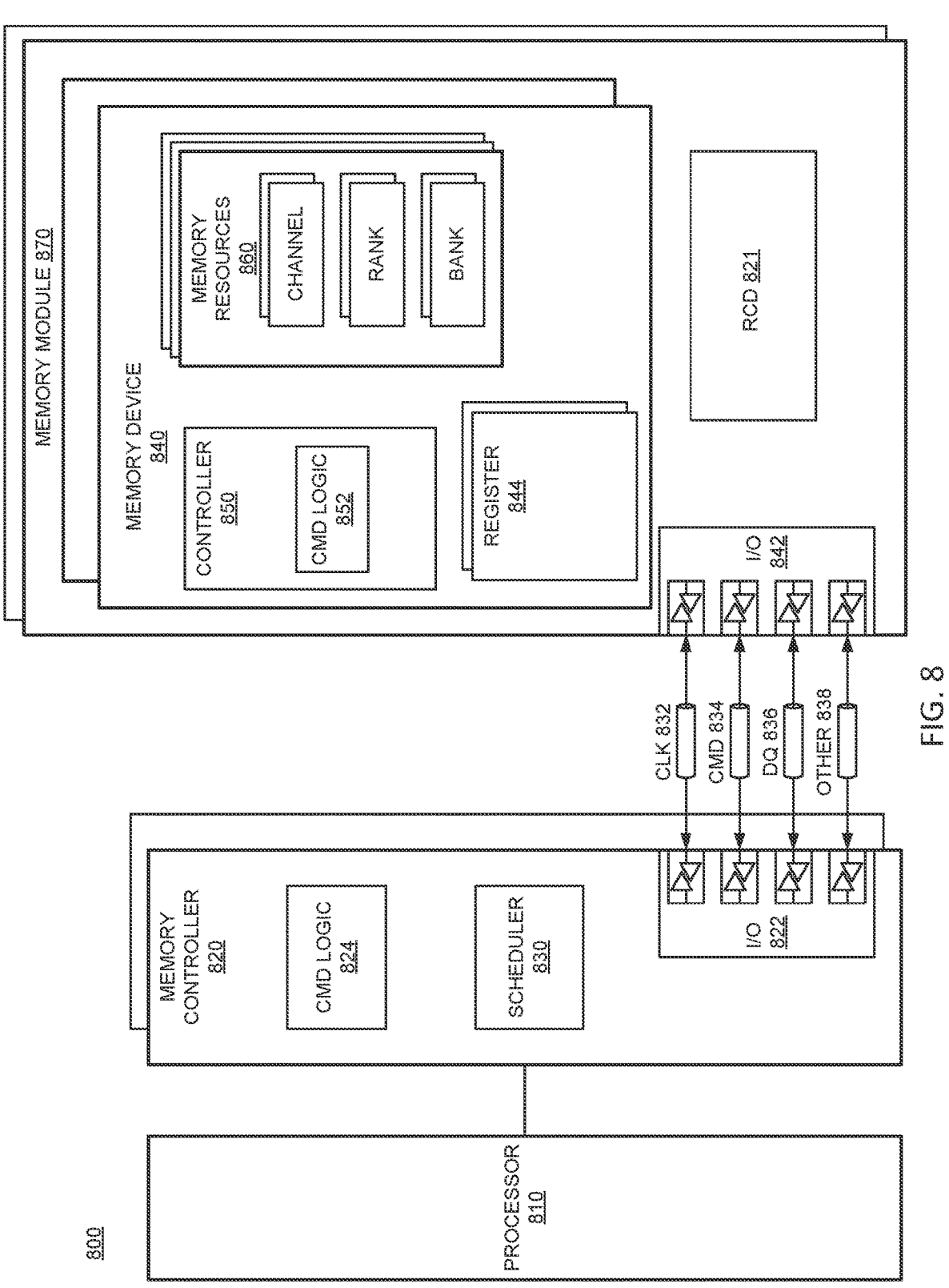
FIG. 8 is a block diagram of an embodiment of a memory subsystem which can include an adapter card with compression-attached memory modules.

FIG. 8 is a block diagram of an embodiment of a memory subsystem which can include an adapter card with compression-attached memory modules. System 800 includes a processor and elements of a memory subsystem in a computing device. Processor 810 represents a processing unit of a computing platform that may execute an operating system (OS) and applications, which can collectively be referred to as the host or the user of the memory. The OS and applications execute operations that result in memory accesses. Processor 810 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 800 can be implemented as an SOC (system on a chip) or be implemented with standalone components.

Reference to memory devices can apply to different memory types. Memory devices often refers to volatile memory technologies. Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

In addition to, or alternatively to, volatile memory, in one embodiment, reference to memory devices can refer to a nonvolatile memory device whose state is determinate even if power is interrupted to the device. In one embodiment, the nonvolatile memory device is a block addressable memory device, such as NAND or NOR technologies. Thus, a memory device can also include a future generation nonvolatile devices, such as a three-dimensional crosspoint memory device, other byte addressable nonvolatile memory devices, or memory devices that use chalcogenide phase change material. In one embodiment, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Descriptions herein referring to a "RAM" or "RAM device" can apply to any memory device that allows random access, whether volatile or nonvolatile. Descriptions referring to a "DRAM" or a "DRAM device" can refer to a volatile random access memory device. The memory device or DRAM can refer to the die itself, to a packaged memory product that includes one or more dies, or both. In one embodiment, a system with volatile memory that needs to be refreshed can also include nonvolatile memory.

Memory controller 820 represents one or more memory controller circuits or devices for system 800. Memory controller 820 represents control logic that generates memory access commands in response to the execution of operations by processor 810. Memory controller 820 accesses one or more memory devices 840. Memory devices 840 can be DRAM devices in accordance with any referred to above. In one embodiment, memory devices 840 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one embodiment, settings for each channel are controlled by separate mode registers or other register settings. In one embodiment, each memory controller 820 manages a separate memory channel, although system 800 can be configured to have multiple channels managed by a single controller, or to have multiple controllers on a single channel. In one embodiment, memory controller 820 is part of host processor 810, such as logic implemented on the same die or implemented in the same package space as the processor.

Memory controller 820 includes I/O interface logic 822 to couple to a memory bus, such as a memory channel as referred to above. I/O interface logic 822 (as well as I/O interface logic 842 of memory module or device 840, and the adapter card between the memory modules 870 and the memory controller 820) can include pins, pads, connectors, signal lines, traces, or wires, or other hardware to connect the devices, or a combination of these. I/O interface logic 822 can include a hardware interface. As illustrated, I/O interface logic 822 includes at least drivers/transceivers for signal lines. Commonly, wires within an integrated circuit interface couple with a pad, pin, or connector to interface signal lines or traces or other wires between devices. I/O interface logic 822 can include drivers, receivers, transceivers, or termination, or other circuitry or combinations of circuitry to exchange signals on the signal lines between the devices. The exchange of signals includes at least one of transmit or receive. While shown as coupling I/O 822 from memory controller 820 to I/O 842 of memory device 840, it will be understood that in an implementation of system 800 where groups of memory devices 840 are accessed in parallel, multiple memory devices can include I/O interfaces to the same interface of memory controller 820. In an implementation of system 800 including one or more memory modules 870, I/O 842 can include interface hardware of the memory module in addition to interface hardware on the memory device itself. Other memory controllers 820 will include separate interfaces to other memory devices 840.

The bus between memory controller 820 and memory devices 840 can be implemented as multiple signal lines coupling memory controller 820 to memory devices 840. The bus may typically include at least clock (CLK) 832, command/address (CMD) 834, and write data (DQ) and read data (DQ) 836, and zero or more other signal lines 838. In one embodiment, a bus or connection between memory controller 820 and memory can be referred to as a memory bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one embodiment, independent channels have different clock signals, C/A buses, data buses, and other signal lines. Thus, system 800 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 820 and memory devices 840. An example of a serial bus technology is 8B10B encoding and transmission of high-speed data with embedded clock over a single differential pair of signals in each direction. In one embodiment, CMD 834 represents signal lines shared in parallel with multiple memory devices. In one embodiment, multiple memory devices share encoding command signal lines of CMD 834, and each has a separate chip select (CS_n) signal line to select individual memory devices.

It will be understood that in the example of system 800, the bus between memory controller 820 and memory devices 840 includes a subsidiary command bus CMD 834 and a subsidiary bus to carry the write and read data, DQ 836. In one embodiment, the data bus can include bidirectional lines for read data and for write/command data. In another embodiment, the subsidiary bus DQ 836 can include unidirectional write signal lines for write and data from the host to memory and can include unidirectional lines for read data from the memory to the host. In accordance with the chosen memory technology and system design, other signals 838 may accompany a bus or sub bus, such as strobe lines DQS. Based on design of system 800, or implementation if a design supports multiple implementations, the data bus can have more or less bandwidth per memory device 840. For example, the data bus can support memory devices that have either a x32 interface, a x16 interface, a x8 interface, or other interface. The convention "xW," where W is an integer that refers to an interface size or width of the interface of memory device 840, which represents a number of signal lines to exchange data with memory controller 820. The interface size of the memory devices is a controlling factor on how many memory devices can be used concurrently per channel in system 800 or coupled in parallel to the same signal lines. In one embodiment, high bandwidth memory devices, wide interface devices, or stacked memory configurations, or combinations, can enable wider interfaces, such as a x128 interface, a x256 interface, a x512 interface, a x1024 interface, or other data bus interface width.

In one embodiment, memory devices 840 and memory controller 820 exchange data over the data bus in a burst, or a sequence of consecutive data transfers. The burst corresponds to a number of transfer cycles, which is related to a bus frequency. In one embodiment, the transfer cycle can be a whole clock cycle for transfers occurring on a same clock or strobe signal edge (e.g., on the rising edge). In one embodiment, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length 8 (BL8), and each memory device 840 can transfer data on each UI. Thus, a x8 memory device operating on BL8 can transfer 64 bits of data (8 data signal lines times 8 data bits transferred per line over the burst). It will be understood that this simple example is merely an illustration and is not limiting.

Memory devices 840 represent memory resources for system 800. In one embodiment, each memory device 840 is a separate memory die. In one embodiment, each memory device 840 can interface with multiple (e.g., 2) channels per device or die. Each memory device 840 includes I/O interface logic 842, which has a bandwidth determined by the implementation of the device (e.g., x16 or x8 or some other interface bandwidth). I/O interface logic 842 enables the memory devices to interface with memory controller 820. I/O interface logic 842 can include a hardware interface and can be in accordance with I/O 822 of memory controller, but at the memory device end. In one embodiment, multiple memory devices 840 are connected in parallel to the same command and data buses. In another embodiment, multiple memory devices 840 are connected in parallel to the same command bus and are connected to different data buses. For example, system 800 can be configured with multiple memory devices 840 coupled in parallel, with each memory device responding to a command, and accessing memory resources 860 internal to each. For a Write operation, an individual memory device 840 can write a portion of the overall data word, and for a Read operation, an individual memory device 840 can fetch a portion of the overall data word. As non-limiting examples, a specific memory device can provide or receive, respectively, 8 bits of a 128-bit data word for a Read or Write transaction, or 8 bits or 16 bits (depending for a x8 or a x16 device) of a 256-bit data word. The remaining bits of the word will be provided or received by other memory devices in parallel.

In one embodiment, memory devices 840 are disposed directly on a motherboard or host system platform (e.g., a PCB (printed circuit board) on which processor 810 is disposed) of a computing device. In one embodiment, memory devices 840 can be organized into memory modules 870. In one embodiment, memory modules 870 represent dual inline memory modules (DIMMs), compression-attached memory modules (CAMMs), or other memory modules. In one embodiment, memory modules 870 represent other organization of multiple memory devices to share at least a portion of access or control circuitry, which can be a separate circuit, a separate device, or a separate board from the host system platform. Memory modules 870 can include multiple memory devices 840, and the memory modules can include support for multiple separate channels to the included memory devices disposed on them. In another embodiment, memory devices 840 may be incorporated into the same package as memory controller 820, such as by techniques such as multi-chip-module (MCM), package-on-package, through-silicon via (TSV), or other techniques or combinations. Similarly, in one embodiment, multiple memory devices 840 may be incorporated into memory modules 870, which themselves may be incorporated into the same package as memory controller 820. It will be appreciated that for these and other embodiments, memory controller 820 may be part of host processor 810.

Memory devices 840 each include memory resources 860. Memory resources 860 represent individual arrays of memory locations or storage locations for data. Typically, memory resources 860 are managed as rows of data, accessed via wordline (rows) and bitline (individual bits within a row) control. Memory resources 860 can be organized as separate channels, ranks, and banks of memory. Channels may refer to independent control paths to storage locations within memory devices 840. A rank refers to memory devices coupled with the same chip select. Ranks may refer to common locations across multiple memory devices (e.g., same row addresses within different devices). Banks may refer to arrays of memory locations within a memory device 840. In one embodiment, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one embodiment, memory devices 840 include one or more registers 844. Register 844 represents one or more storage devices or storage locations that provide configuration or settings for the operation of the memory device. In one embodiment, register 844 can provide a storage location for memory device 840 to store data for access by memory controller 820 as part of a control or management operation. In one embodiment, register 844 includes one or more Mode Registers. In one embodiment, register 844 includes one or more multipurpose registers. The configuration of locations within register 844 can configure memory device 840 to operate in different "modes," where command information can trigger different operations within memory device 840 based on the mode. Additionally, or in the alternative, different modes can also trigger different operation from address information or other signal lines depending on the mode. Settings of register 844 can indicate configuration for I/O settings (e.g., timing, termination or ODT (on-die termination), driver configuration, or other I/O settings).

Memory device 840 includes controller 850, which represents control logic within the memory device to control internal operations within the memory device. For example, controller 850 decodes commands sent by memory controller 820 and generates internal operations to execute or satisfy the commands. Controller 850 can be referred to as an internal controller and is separate from memory controller 820 of the host. Controller 850 can determine what mode is selected based on register 844 and configure the internal execution of operations for access to memory resources 860 or other operations based on the selected mode. Controller 850 generates control signals to control the routing of bits within memory device 840 to provide a proper interface for the selected mode and direct a command to the proper memory locations or addresses. Controller 850 includes command logic 852, which can decode command encoding received on command and address signal lines. Thus, command logic 852 can be or include a command decoder. With command logic 852, memory device can identify commands and generate internal operations to execute requested commands.

Referring again to memory controller 820, memory controller 820 includes command (CMD) logic 824, which represents logic or circuitry to generate commands to send to memory devices 840. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 840, memory controller 820 can issue commands via I/O 822 to cause memory device 840 to execute the commands. In one embodiment, controller 850 of memory device 840 receives and decodes command and address information received via I/O 842 from memory controller 820. Based on the received command and address information, controller 850 can control the timing of operations of the logic and circuitry within memory device 840 to execute the commands. Controller 850 is responsible for compliance with standards or specifications within memory device 840, such as timing and signaling requirements. Memory controller 820 can implement compliance with standards or specifications by access scheduling and control.

Memory controller 820 includes scheduler 830, which represents logic or circuitry to generate and order transactions to send to memory device 840. From one perspective, the primary function of memory controller 820 could be said to schedule memory access and other transactions to memory device 840. Such scheduling can include generating the transactions themselves to implement the requests for data by processor 810 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 820 typically includes logic such as scheduler 830 to allow selection and ordering of transactions to improve performance of system 800. Thus, memory controller 820 can select which of the outstanding transactions should be sent to memory device 840 in which order, which is typically achieved with logic much more complex that a simple first-in first-out algorithm. Memory controller 820 manages the transmission of the transactions to memory device 840, and manages the timing associated with the transaction. In one embodiment, transactions have deterministic timing, which can be managed by memory controller 820 and used in determining how to schedule the transactions with scheduler 830.

Referring again to the memory module 870, in one example, a buffer device 821 is included on the module 870 to buffer signals between the memory controller and the memory devices and control the timing and signaling to the DRAMs. In some examples, a buffer device is referred to as a register or a registered or registering clock driver (RCD). The RCD 821 receives command and clock signals from the memory controller 820 and forwards them to the memory devices in accordance with relevant protocols and standard specifications. For example, the RCD 821 may be in compliance with the DDR4 Registering Clock Driver Specification (DDR4RCD02 JESD82-31A), the DDR5 Registering Clock Driver Specification (DDR5RCD02 currently in discussion by JEDEC), or other RCD standards. Other memory modules are unbuffered and do not include an RCD. A buffer device may also be included to buffer data signals.

The memory modules 870 of FIG. 8 may be coupled with the memory controller 820 via one or more adapter cards as described herein, such as the adapter card 210 of FIG. 2A. In one such example, the adapter card includes I/O interface circuitry comparable to the I/O interface circuitry 842 for coupling with the memory controller 820.

Figure 9:
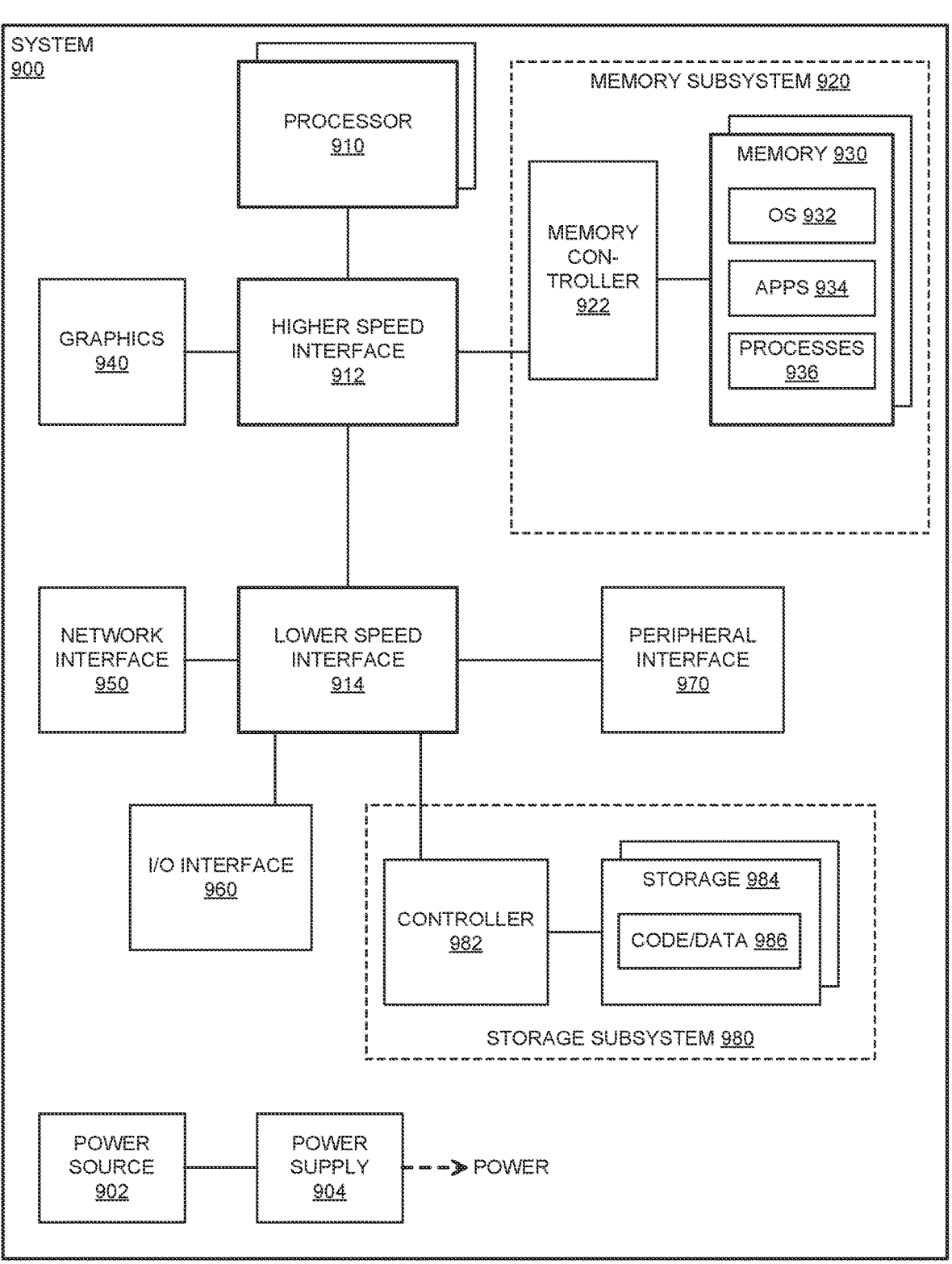
FIG. 9 is a block diagram of an embodiment of a computing system that can include an adapter card with compression-attached memory modules.

FIG. 9 is a block diagram of an embodiment of a computing system that can include an adapter card with compression-attached memory modules. System 900 represents a computing device in accordance with any embodiment described herein, and can be a laptop computer, a desktop computer, a tablet computer, a server, a gaming or entertainment control system, a scanner, copier, printer, routing or switching device, embedded computing device, a smartphone, a wearable device, an internet-of-things device, or other electronic device.

System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one embodiment, system 900 includes interface 912 coupled to processor 910, which can represent a higher speed interface or a high throughput interface for system components that needs higher bandwidth connections, such as memory subsystem 920 or graphics interface components 940. Interface 912 represents an interface circuit, which can be a standalone component or integrated onto a processor die. Where present, graphics interface 940 interfaces to graphics components for providing a visual display to a user of system 900. In one embodiment, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one embodiment, the display can include a touchscreen display. In one embodiment, graphics interface 940 generates a display based on data stored in memory 930 or based on operations executed by processor 910 or both. In one embodiment, graphics interface 940 generates a display based on data stored in memory 930 or based on operations executed by processor 910 or both.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random-access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one embodiment, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one embodiment, system 900 includes interface 914, which can be coupled to interface 912. Interface 914 can be a lower speed interface than interface 912. In one embodiment, interface 914 represents an interface circuit, which can include standalone components and integrated circuitry. In one embodiment, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can exchange data with a remote device, which can include sending data stored in memory or receiving data to be stored in memory.

In one embodiment, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one embodiment, system 900 includes storage subsystem 980 to store data in a nonvolatile manner. In one embodiment, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (i.e., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (i.e., the value or state of the data is indeterminate if power is interrupted to system 900). In one embodiment, storage subsystem 980 includes controller 982 to interface with storage 984. In one embodiment controller 982 is a physical part of interface 914 or processor 910 or can include circuits or logic in both processor 910 and interface 914.

Power source 902 provides power to the components of system 900. More specifically, power source 902 typically interfaces to one or multiple power supplies 904 in system 900 to provide power to the components of system 900. In one embodiment, power supply 904 includes an AC to DC (alternating current to direct current) adapter to plug into a wall outlet. Such AC power can be renewable energy (e.g., solar power) power source 902. In one embodiment, power source 902 includes a DC power source, such as an external AC to DC converter. In one embodiment, power source 902 or power supply 904 includes wireless charging hardware to charge via proximity to a charging field. In one embodiment, power source 902 can include an internal battery or fuel cell source.

Examples of memory module adapters follow:

Example 1: An apparatus including a printed circuit board (PCB) having an edge to be received by a dual-inline memory module (DIMM) connector. The PCB includes first conductive contacts to couple with contacts of the DIMM connector, second conductive contacts on a first face of the PCB, and conductive traces between the first conductive contacts and the second conductive contacts. The apparatus includes a memory module compressibly attached to the first face of the PCB, and compressible conductive contacts between the second conductive contacts on the first face of the PCB and third conductive contacts of the memory module.

Example 2: The apparatus of example 1, wherein: the compressible conductive contacts are included in a compression mount technology (CMT) connector between the PCB and the memory module.

Example 3: The apparatus of example 1 or 2, wherein: the conductive traces couple the first conductive contacts having a first pin-out with corresponding contacts of the second conductive contacts having a second pin-out that is different than the first pin-out.

Example 4: The apparatus of any of examples 1-3, wherein: the first conductive contacts include power, ground, and data contacts compatible with a first memory standard having the first pin-out, the second conductive contacts include second power, ground, and data contacts compatible with a second memory standard having the second pin-out, and the conductive traces couple the power, ground, and data contacts of the first conductive contacts with corresponding second power, ground, and data contacts of the second conductive contacts.

Example 5: The apparatus of any of examples 1-4, wherein: the conductive traces couple the first conductive contacts having a first pitch with corresponding contacts of the second conductive contacts having a second pitch that is smaller than the first pitch.

Example 6: The apparatus of any of examples 1-5, further including: fourth conductive contacts on a second face of the PCB, a second memory module compressibly attached to the second face of the PCB, and second compressible conductive contacts between the fourth conductive contacts on the second face of the PCB and fifth conductive contacts of the second memory module.

Example 7: The apparatus of any of examples 1-6, wherein: the PCB is to couple two compression attached memory modules (CAMMs) or CMT memory modules with the DIMM connector.

Example 8: The apparatus of any of examples 1-7, wherein: the DIMM connector is a double data rate synchronous dynamic random-access memory (DDR SDRAM) DIMM connector, and the memory module is a compression attached memory module (CAMM) or CMT memory module.

Example 9: The apparatus of any of examples 1-8, further including a fastener to compressibly attach the memory module to the PCB.

Example 10: The apparatus of any of examples 1-9, wherein the memory module is attached to the PCB (e.g., PCB of an memory module adapter card) parallel to the adapter card and perpendicular to the motherboard.

Example 11: A system including: a motherboard including a first dual-inline memory module (DIMM) connector, and a printed circuit board (PCB) having an edge to be received by the DIMM connector, the PCB including: first conductive contacts to couple with contacts of the DIMM connector, second conductive contacts on a first face of the PCB, and conductive traces between the first conductive contacts and the second conductive contacts. The system also includes a memory module compressibly attached to the first face of the PCB, and compressible conductive contacts between the second conductive contacts on the first face of the PCB and third conductive contacts of the memory module.

Example 12: The system of example 11, further including fourth conductive contacts on a second face of the PCB, a second memory module compressibly attached to the second face of the PCB, and second compressible conductive contacts between the fourth conductive contacts on the second face of the PCB and fifth conductive contacts of the second memory module.

Example 13: The system of example 11 or 12, further including: a second DIMM connector on the motherboard, and a second PCB having an edge to be received by the second DIMM connector, wherein the first PCB couples two compression attached memory modules (CAMMs) with the first DIMM connector, and wherein the second PCB couples two CAMMs with the second DIMM connector.

Example 14: The system of any of examples 11-13, wherein: the distance between adjacent DIMM connectors (e.g., the first DIMM connector and the second DIMM connector) is greater than the distance between the two CAMMs coupled with the first PCB or the second PCB.

Example 15: The system of any of examples 11-14, wherein: a single one of the first DIMM connector and the second DIMM connector corresponds to a memory channel.

Example 16: The system of any of examples 11-14, wherein: the two CAMMs coupled with a one of the first PCB or the second PCB are directly coupled with one another through the PCB.

Example 17: The system of any of examples 11-14, wherein the PCB is in accordance with any of examples 2-10.

Example 18: An apparatus including: a printed circuit board (PCB) having an edge to be received by a dual-inline memory module (DIMM) connector, first conductive contacts proximate to the edge of the PCB to be received by the DIMM connector, the first conductive contacts to couple with contacts of the DIMM connector, second conductive contacts on a first face of the PCB to couple with a first compression attached memory module (CAMM) via a first compression mount technology (CMT) connector, third conductive contacts on a second face of the PCB to couple with a second CAMM via a second CMT connector, and conductive traces between the first conductive contacts and the second conductive contacts, and between the first conductive contacts and the third conductive contacts.

Example 19: The apparatus of example 18, further including: the first CMT connector, and the first CAMM.

Example 20: The apparatus of example 18 or 19, wherein the apparatus is in accordance with any of examples 2-10.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a printed circuit board (PCB) having an edge to be received by a dual-inline memory module (DIMM) connector, the PCB including:
first conductive contacts to couple with contacts of the DIMM connector,
second conductive contacts on a first face of the PCB,
third conductive contacts on a second face of the PCB,
first conductive traces between the first conductive contacts and the second conductive contacts, and
second conductive traces between the first conductive contacts and the third conductive contacts;
a first compression attached memory module (CAMM) compressibly attached to the first face of the PCB via first compressible conductive contacts between the second conductive contacts on the first face of the PCB and third fourth conductive contacts of the first CAMM; and
a second CAM compressibly attached to the second face of the PCB via second compressible conductive contacts between the third conductive contacts on the second face of the PCB and fifth conductive contacts of the second CAMM.

2. The apparatus of claim 1, wherein:
the first compressible conductive contacts are included in a first compression mount technology (CMT) connector between the PCB and the first CAMM, and
the second compressible conductive contacts are included in a second CMT connector between the PCB and the second CAMM.

3. The apparatus of claim 1, wherein:
the first conductive traces couple the first conductive contacts having a first pin-out with corresponding contacts of the second conductive contacts having a second pin-out that is different than the first pin-out, and
the second conductive traces couple the first conductive contacts having the first pin-out with corresponding contacts of the third conductive contacts having the second pin-out that is different than the second pin-out.

4. The apparatus of claim 3, wherein:
the first conductive contacts include power, ground, and data contacts compatible with a first memory standard having the first pin-out;
the second and third conductive contacts include second power, ground, and data contacts compatible with a second memory standard having the second pin-out;
the first conductive traces couple the power, ground, and data contacts of the first conductive contacts with corresponding second power, ground, and data contacts of the second conductive contacts; and
the second conductive traces couple the power, ground, and data contacts of the first conductive contacts with corresponding third power, ground, and data contacts of the third conductive contacts.

5. The apparatus of claim 1, wherein:
the first conductive traces couple the first conductive contacts having a first pitch with corresponding contacts of the second conductive contacts having a second pitch that is smaller than the first pitch, and
the second conductive traces couple the first conductive contacts having the first pitch with corresponding contacts of the third conductive contacts having the second pitch that is smaller than the first pitch.

6. The apparatus of claim 1, wherein:
the DIMM connector is a double data rate synchronous dynamic random-access memory (DDR SDRAM) DIMM connector.

7. The apparatus of claim 1, further comprising:
a first fastener to compressibly attach the first CAMM to the PCB; and
a second fastener to compressible attach the second CAMM to the PCB.

8. A system comprising:
a motherboard including a first dual-inline memory module (DIMM) connector; and
a printed circuit board (PCB) having an edge to be received by the DIMM connector, the PCB including:
first conductive contacts to couple with contacts of the DIMM connector,
second conductive contacts on a first face of the PCB, and
third conductive contacts on a second face of the PCB,
first conductive traces between the first conductive contacts and the second conductive contacts, and
second conductive traces between the first conductive contacts and the third conductive contacts;
a first compression attached memory module (CAMM) compressibly attached to the first face of the PCB via first compressible conductive contacts between the second conductive contacts on the first face of the PCB and third fourth conductive contacts of the first CAMM; and
a second CAM compressibly attached to the second face of the PCB via second compressible conductive contacts between the third conductive contacts on the second face of the PCB and fifth conductive contacts of the second CAMM.

9. The system of claim 8, further comprising:
a second DIMM connector on the motherboard; and
a second PCB having an edge to be received by the second DIMM connector;
wherein the second PCB also couples two CAMMs with the second DIMM connector.

10. The system of claim 9, wherein:
the distance between the first DIMM connector and the second DIMM connector is greater than the distance between the two CAMMs coupled with the first PCB or the second PCB.

11. The system of claim 9, wherein:
a single one of the first DIMM connector and the second DIMM connector corresponds to a memory channel.

12. The system of claim 9, wherein:
the two CAMMs coupled with a one of the first PCB or the second PCB are directly coupled with one another through the PCB.

13. The system of claim 8, wherein:
the first compressible conductive contacts are included in a first compression mount technology (CMT) connector between the PCB and the first CAMM, and
the second compressible conductive contacts are included in a second CMT connector between the PCB and the second CAMM.

14. The system of claim 8, wherein:

the first conductive traces couple the first conductive contacts having a first pin-out with corresponding contacts of the second conductive contacts having a second pin-out that is different than the first pin-out, and the second conductive traces couple the first conductive contacts having the first pin-out with corresponding contacts of the third conductive contacts having the second pin-out that is different than the second pin-out.

15. The system of claim 8, wherein:

the first conductive traces couple the first conductive contacts having a first pitch with corresponding contacts of the second conductive contacts having a second pitch that is smaller than the first pitch, and the second conductive traces couple the first conductive contacts having the first pitch with corresponding contacts of the third conductive contacts having the second pitch that is smaller than the first pitch.

16. An apparatus comprising:

a printed circuit board (PCB) having an edge to be received by a dual-inline memory module (DIMM) connector;

first conductive contacts proximate to the edge of the PCB to be received by the DIMM connector, the first conductive contacts to couple with contacts of the DIMM connector;

second conductive contacts on a first face of the PCB to couple with a first compression attached memory module (CAMM) via a first compression mount technology (CMT) connector;

third conductive contacts on a second face of the PCB to couple with a second CAMM via a second CMT connector;

first conductive traces between the first conductive contacts and the second conductive contacts; and second conductive traces between the first conductive contacts and the third conductive contacts.

17. The apparatus of claim 16, further comprising:

the first CMT connector; and the first CAMM.

18. The apparatus of claim 16, wherein:

the first conductive traces couple the first conductive contacts having a first pin-out with corresponding contacts of the second conductive contacts having a second pin-out that is different than the first pin-out, and the second conductive traces couple the first conductive contacts having the first pin-out with corresponding contacts of the third conductive contacts having the second pin-out that is different than the second pin-out.

19. The apparatus of claim 18, wherein:

the first conductive contacts include power, ground, and data contacts compatible with a first memory standard having the first pin-out;

the second and third conductive contacts include second power, ground, and data contacts compatible with a second memory standard having the second pin-out;

the first conductive traces couple the power, ground, and data contacts of the first conductive contacts with corresponding second power, ground, and data contacts of the second conductive contacts; and the second conductive traces couple the power, ground, and data contacts of the first conductive contacts with corresponding third power, ground, and data contacts of the third conductive contacts.

20. The system of claim 14, wherein:

the first conductive contacts include power, ground, and data contacts compatible with a first memory standard having the first pin-out;

the second and third conductive contacts include second power, ground, and data contacts compatible with a second memory standard having the second pin-out;

the first conductive traces couple the power, ground, and data contacts of the first conductive contacts with corresponding second power, ground, and data contacts of the second conductive contacts; and the second conductive traces couple the power, ground, and data contacts of the first conductive contacts with corresponding third power, ground, and data contacts of the third conductive contacts.

* * * * *